United States Patent
Huang et al.

(10) Patent No.: US 7,710,095 B2
(45) Date of Patent: May 4, 2010

(54) POWER CONVERTER HAVING PWM CONTROLLER FOR MAXIMUM OUTPUT POWER COMPENSATION

(75) Inventors: Wei-Hsuan Huang, Taipei (TW);
Chien-Yuan Lin, Taipei (TW);
Cheng-Chi Hsueh, Taipei (TW)

(73) Assignee: System General Corporation, Taipei (TW)

( * ) Notice: Subject to any disclaimer, the term of this patent is extended or adjusted under 35 U.S.C. 154(b) by 328 days.

(21) Appl. No.: 12/024,679

(22) Filed: Feb. 1, 2008

(65) Prior Publication Data
US 2008/0291700 A1    Nov. 27, 2008

Related U.S. Application Data

(60) Provisional application No. 60/939,552, filed on May 22, 2007.

(51) Int. Cl.
*G05F 1/40* (2006.01)
*H02M 7/10* (2006.01)

(52) U.S. Cl. .......................... 323/288; 323/49

(58) Field of Classification Search .................. 323/282, 323/284, 351, 901; 363/49, 55; 327/134, 327/136, 137; 375/238
See application file for complete search history.

(56) References Cited

U.S. PATENT DOCUMENTS

| | | | | |
|---|---|---|---|---|
| 5,886,586 | A * | 3/1999 | Lai et al. | 375/238 |
| 7,176,668 | B2 * | 2/2007 | Oswald et al. | 323/288 |
| 7,180,274 | B2 * | 2/2007 | Chen et al. | 323/284 |
| 7,609,042 | B2 * | 10/2009 | Kokubun et al. | 323/284 |

* cited by examiner

*Primary Examiner*—Jessica Han

(57) ABSTRACT

A PWM controller compensates a maximum output power of a power converter having a power switch. The PWM controller includes an oscillator for generating a saw signal and a pulse signal, a power limiter coupled to the oscillator for generating a saw-limited signal in response to the saw signal, and a PWM unit coupled to the power limiter and the oscillator to generate a PWM signal for controlling the power switch in response to the saw-limited signal and the pulse signal. The saw-limited signal has a level being flattened during a period of time before an output voltage is generated, and is then transformed to a saw-limited waveform after the period of time.

12 Claims, 6 Drawing Sheets

POWER CONVERTER HAVING PWM CONTROLLER FOR MAXIMUM OUTPUT POWER COMPENSATION

CROSS-REFERENCE TO RELATED APPLICATION(S)

This application claims the benefit of U.S. Provisional Patent Application Ser. No. 60/939,552 filed May 22, 2007, and the subject matter thereof is hereby incorporated herein by reference thereto.

FIELD OF THE INVENTION

The present invention relates to power converters, and more particularly, to a control circuit having a power limiter used for compensating a maximum output power of a switching power converter.

BACKGROUND OF THE INVENTION

Power converters are generally used to power many of electronic devices. The pulse-width modulation (PWM) technique is a conventional technology used in a power converter to control and regulate the output power. Various protection functions are built-in in the power converter to protect the power converter from permanent damage. The function of compensating the maximum output power is commonly used for overload and short-circuit protections.

FIG. 1 shows a traditional power converter. The power converter includes a power transformer $T_1$ having a primary winding $N_P$ and a secondary winding $N_S$. The power transformer $T_1$ is to provide galvanic isolation between AC line input and an output of the power converter for safety. The primary winding $N_P$ is supplied with an input voltage $V_{IN}$ Of the power converter. In order to regulate an output voltage $V_O$ of the power converter, a control circuit coupled in series with the primary winding $N_P$ of the power transformer $T_1$ generates a PWM signal $V_{PWM}$ in response to a feedback signal $V_{FB}$. The control circuit comprises an oscillator 10, a first comparator 31, a second comparator 32, a logic circuit 33, and a flip-flop 20. The PWM signal $V_{PWM}$ controls a power switch $Q_1$ to switch the power transformer $T_1$. A sense resistor $R_S$ is connected in series with the power switch $Q_1$ to determine the maximum output power of the power converter. The sense resistor $R_S$ turns the switching current of the transformer $T_1$ to a current signal $V_{CS}$. The current signal $V_{CS}$ is coupled to the control circuit. If the current signal $V_{CS}$ is greater than a maximum threshold $V_M$ through the first comparator 31, the control circuit is coupled to disable the PWM signal $V_{PWM}$, and it also restricts the maximum output power of the power converter.

FIG. 2 shows the signal waveforms of the PWM signal $V_{PWM}$ and the current signal $V_{CS}$ of the power converter in FIG. 1. As the PWM signal $V_{PWM}$ becomes logic-high, a primary-side switching current $I_P$ will be generated accordingly. A peak value $I_{P1}$ of the primary-side switching current $I_P$ can be given by, $$I_{P1} = \frac{V_{IN}}{L_P} \times T_{ON} \qquad (1)$$

The maximum output power $P_O$ can be expressed by, $$P_O = \frac{L_P}{2 \times T_S} \times I_{P1}^2 = \frac{V_{IN}^2 \times T_{ON}^2}{2 \times L_P \times T_S} \qquad (2)$$

In Equations (1) and (2), $L_P$ is the inductance of the primary winding $N_P$ of the transformer $T_1$, and $T_{ON}$ is an on-time of the PWM signal $V_{PWM}$ while the power switch $Q_1$ is switched on, and $T_S$ is the switching period of the PWM signal $V_{PWM}$.

From Equation (2), we find that the output power varies as the input voltage $V_{IN}$ varies. The input voltage ranges between $90V_{AC}$ and $264V_{AC}$ when the safety regulations are taken into consideration, and wherein the power limit in high line voltage is many times higher than the power limit in low line voltage. There is a delay time $T_D$ from the moment the voltage in current signal $V_{CS}$ is higher than the maximum threshold $V_M$ to the moment the PWM signal $V_{PWM}$ is actually turned off. The maximum output power is also affected by the delay time $T_D$ of the control circuit. In the period of the delay time $T_D$, the power switch $Q_1$ is still turned on, and it keeps on-state for delivering the output power. Therefore, the actual on-time of the PWM signal $V_{PWM}$ is equal to $T_{ON}+T_D$, and the actual maximum output power $P_O$ becomes as follows:

$$P_O = \frac{V_{IN}^2 \times (T_{ON} + T_D)^2}{2 \times L_P \times T_S} \qquad (3)$$

Although the delay time $T_D$ is short, generally within the range of 200 nsec~350 nsec, the higher the operating frequency and smaller the switching period $T_S$, the more influential impact is caused by the delay time $T_D$. Therefore, the input voltage $V_{IN}$ should be compensated properly, such that the input voltage $V_{IN}$ does not affect the maximum output power.

SUMMARY OF THE INVENTION

An objective of the present invention is to provide a control circuit for compensating the maximum output power of a power converter. A power limiter of the control circuit can compensate the difference caused by the input voltage and the delay time, and an identical output power limit for the low line and high line voltage input can be achieved.

Another objective of the present invention is to develop a delay counter to flatten a limit signal of the power limiter before an output voltage is generated. By properly selecting a delay period and disabling the limit signal, an unable start-up problem for the low-line voltage and heavy-load condition can be solved.

Another objective of the present invention is to develop a feedback detector to sense a feedback signal of the power converter. The feedback detector generates a detecting signal to determine the limit signal in response to the feedback signal.

In order to achieve the above and other objections, a PWM controller is provided according to the present invention. The PWM controller compensates a maximum output power of a power converter having a power switch. The PWM controller includes an oscillator for generating a saw signal and a pulse signal, a power limiter coupled to the oscillator for generating a saw-limited signal in response to the saw signal, and a PWM unit coupled to the power limiter and the oscillator to generate a PWM signal for controlling the power switch in response to the saw-limited signal and the pulse signal. The saw-limited signal has a level being flattened during a period of time before an output voltage is generated, and is then transformed to a saw-limited waveform after the period of time.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
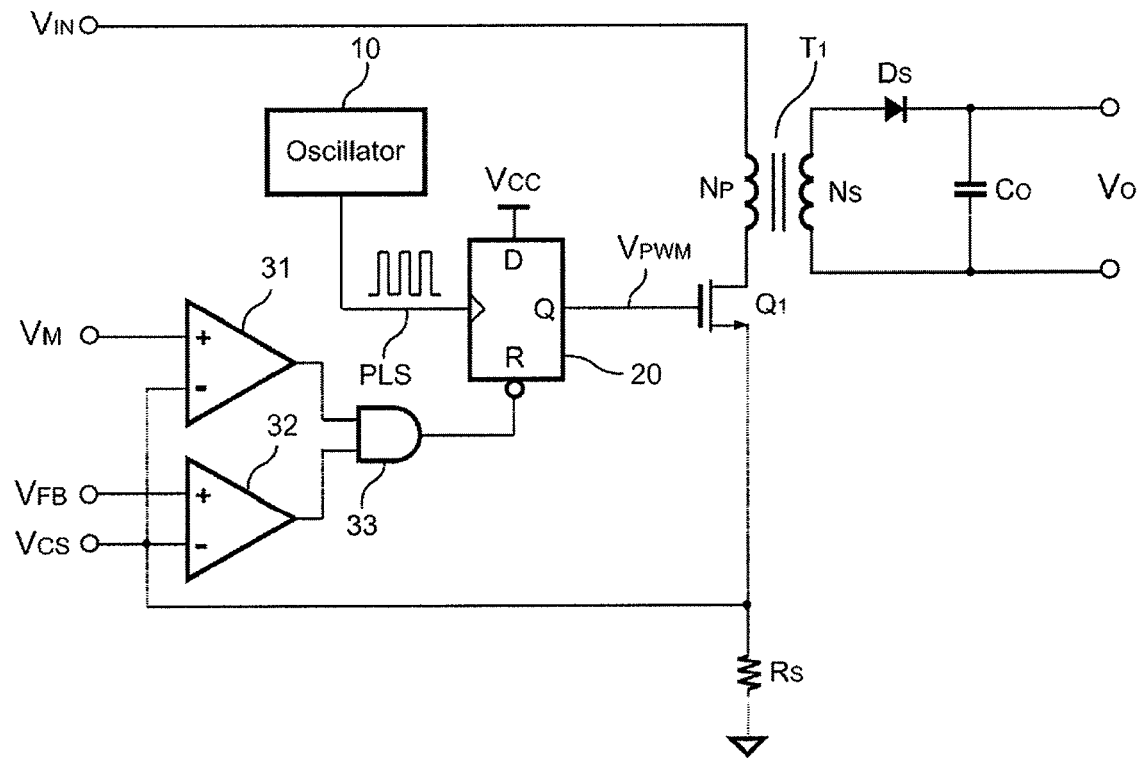
FIG. 1 shows a traditional power converter.
Figure 2:
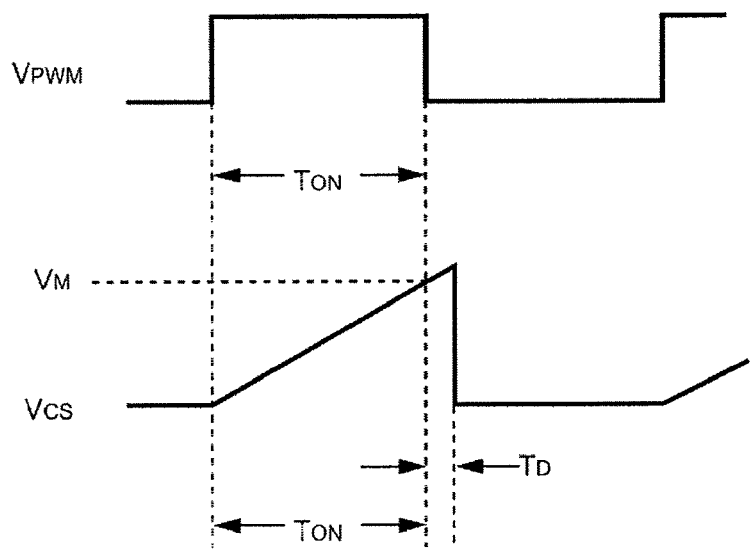
FIG. 2 shows the signal waveforms of the PWM signal and the current signal of the traditional power converter shown in FIG. 1.
Figure 3:
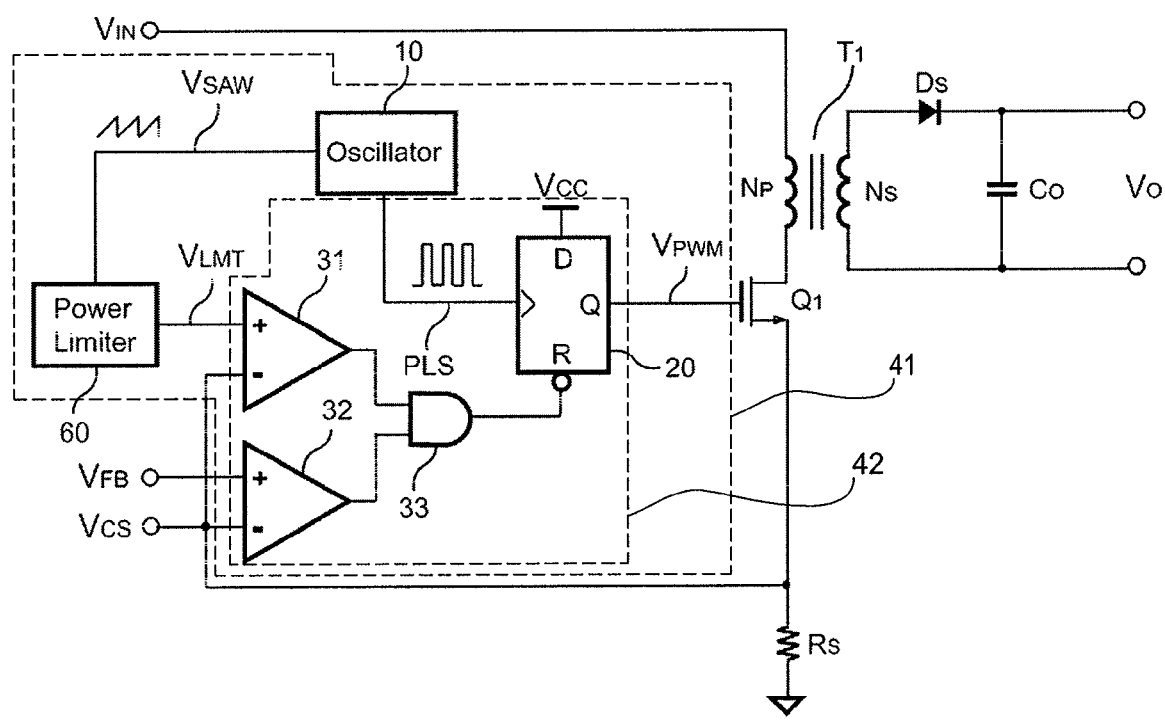
FIG. 3 shows a power converter having a control circuit in accordance with the present invention.

Referring to FIG. 3, which is a circuit diagram of a power converter according to an embodiment of the present invention. The power converter includes a power transformer $T_1$ having a primary winding $N_P$ and a secondary winding $N_S$. The power transformer $T_1$ transfers the stored energy from the primary winding $N_P$ to the secondary winding $N_S$. The primary winding $N_P$ is supplied with an input voltage $V_{IN}$ of the power converter. In order to regulate an output voltage $V_O$ of the power converter, a PWM controller 41 is coupled in series with the primary winding $N_P$ of the power transformer $T_1$ to generate a PWM signal $V_{PWM}$ in response to a feedback signal $V_{FB}$. The PWM signal $V_{PWM}$ controls a power switch $Q_1$ to switch the power transformer $T_1$. A sense resistor $R_S$ is connected in series with the power switch $Q_1$ to determine the maximum output power of the power converter. The sense resistor $R_S$ transforms the switching current of the power transformer $T_1$ to a current signal $V_{CS}$. The current signal $V_{CS}$ is coupled to the PWM controller 41.

In one embodiment, the PWM controller 41 includes an oscillator 10, a power-limiter 60 and a PWM unit 42. The oscillator 10 generates a saw signal $V_{SAW}$ and a pulse signal PLS. The power limiter 60 is coupled to the oscillator 10 for generating a saw-limited signal $V_{LMT}$ in response the saw signal $V_{SAW}$. The PWM unit 42 is coupled to the power limiter 60 and the oscillator 10 to generate the PWM signal $V_{PWM}$ for controlling the power switch $Q_1$ in response to the saw signal $V_{SAW}$ and the pulse signal PLS. The PWM unit 42 comprises a flip-flop 20, comparators 31, 32 and an AND gate 33.

Figure 4:
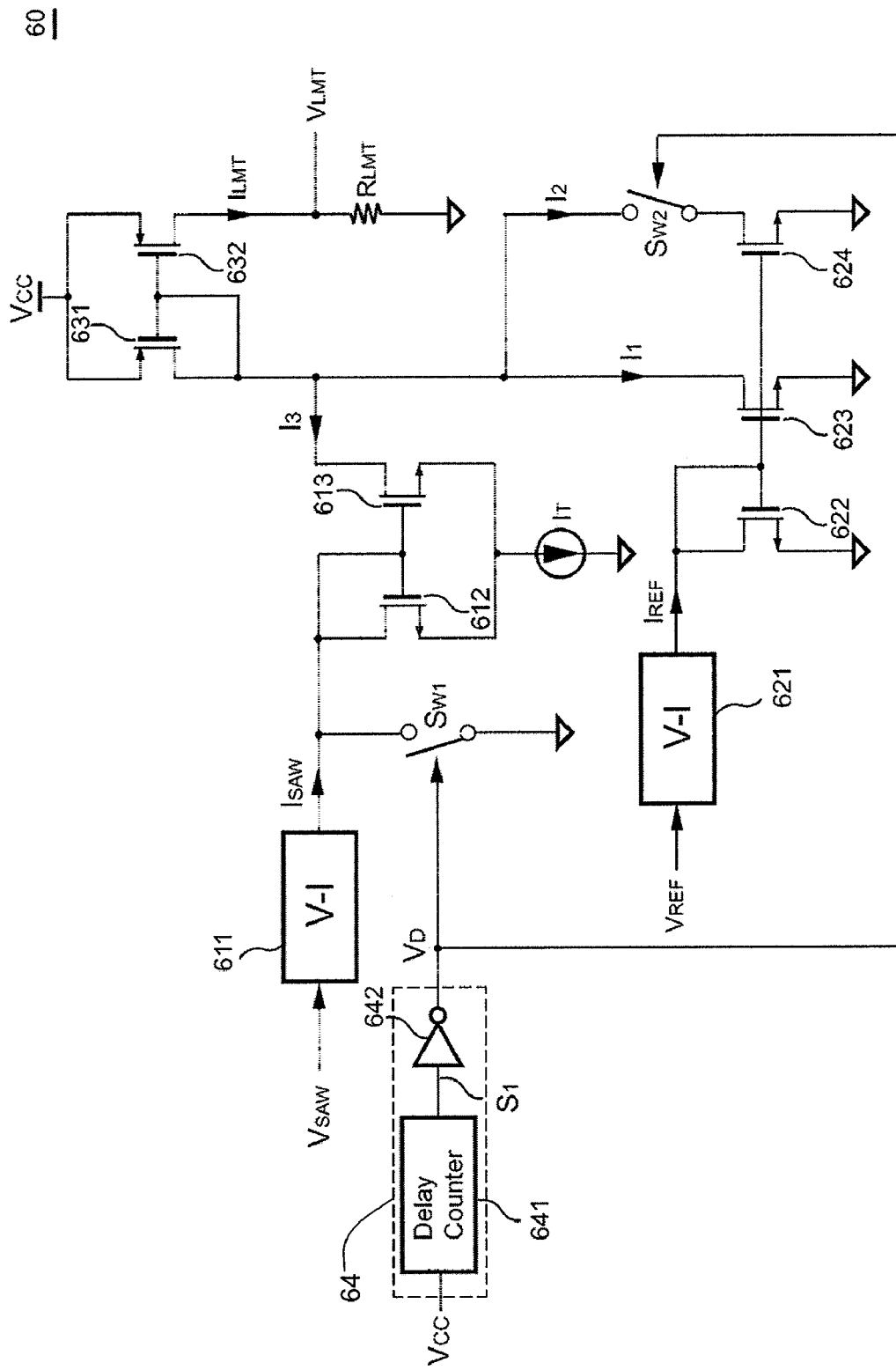
FIG. 4 illustrates one embodiment of the power limit of the control circuit in accordance with the present invention.

As shown in FIG. 4, in the first embodiment, the power-limiter 60 includes a delay unit 64 and a saw-limited circuit. The delay unit 64 comprises a delay counter 641 and an inverter 642. The delay counter 641 is coupled to a voltage source $V_{CC}$ for generating a delay signal $S_1$ after a delay time in response to the enabling of the voltage source $V_{CC}$. The inverter 642 is coupled to an output of the delay counter 641 for inverting the delay signal $S_1$ to become a control signal $V_D$.

Referring to FIG. 4 again, the saw-limited circuit further comprises a first reference circuit, a second reference circuit, and a current-limited circuit. A voltage-to-current circuit (V-I) 621 and a current mirror composed of transistors 622, 623 develop the first reference circuit. The voltage-to-current circuit (V-I) 621, a current mirror composed of transistors 622, 624 and a switch $S_{W2}$ develop the second reference circuit. The voltage-to-current circuit (V-I) 621 of the first reference circuit is coupled to receive a reference voltage $V_{REF}$ for converting to a corresponding reference current $I_{REF}$, and then mirrors to an output of the transistor 623 for generating a first reference signal $I_1$. The reference current $I_{REF}$ mirrors to an output of the transistor 624 for generating a second reference signal $I_2$ when the switch $S_{W2}$ is turned on. The switch $S_{W2}$ is controlled by the control signal $V_D$ of the delay unit.

A voltage-to-current circuit (V-I) 611, a switch $S_{W1}$, two current mirrors composed of transistors 612, 613, and 631, 632, respectively, develop the current-limited circuit. The voltage-to-current circuit (V-I) 611 is coupled to receive and convert the saw signal $V_{SAW}$ of the oscillator 10 (as shown in FIG. 3) to a corresponding current signal $I_{SAW}$. The switch $S_{W1}$, coupled between an output of the voltage-to-current circuit (V-I) 611 and a ground, is controlled by the control signal $V_D$ of the delay unit. Therefore, the current signal $I_{SAW}$ is passed to the ground when the switch $S_{W1}$ is turned on. The current signal $I_{SAW}$ mirrors to an output of the transistor 613 for generating a third reference signal $I_3$ when the switch $S_{W1}$ is turned off. A source terminal of the transistors 612 and 613 is further coupled to a current source $I_T$, so that a peak value of the saw signal $V_{SAW}$ will be limited by the current source $I_T$. Another current mirror comprises transistors 631 and 632, wherein a gate terminal of the transistor 631 is coupled to a drain terminal of the transistor 631. A drain terminal of the transistor 623 generates the first reference signal $I_1$ in accordance with the reference current $I_{REF}$. A drain terminal of the transistor 624 through the switch $S_{W2}$ generates the second reference signal $I_2$ in accordance with the reference current $I_{REF}$. A current-limited signal $I_{LMT}$ is generated by a drain terminal of the transistor 632 in response to the first reference signal $I_1$, the second reference signal $I_2$, and the third reference signal $I_3$. A saw-limited signal $V_{LMT}$ is therefore generated in accordance with the current-limited signal $I_{LMT}$ flowing through a resistor $R_{LMT}$, i.e., $V_{LMT}=I_{LMT}*R_{LMT}$.

Figure 5:
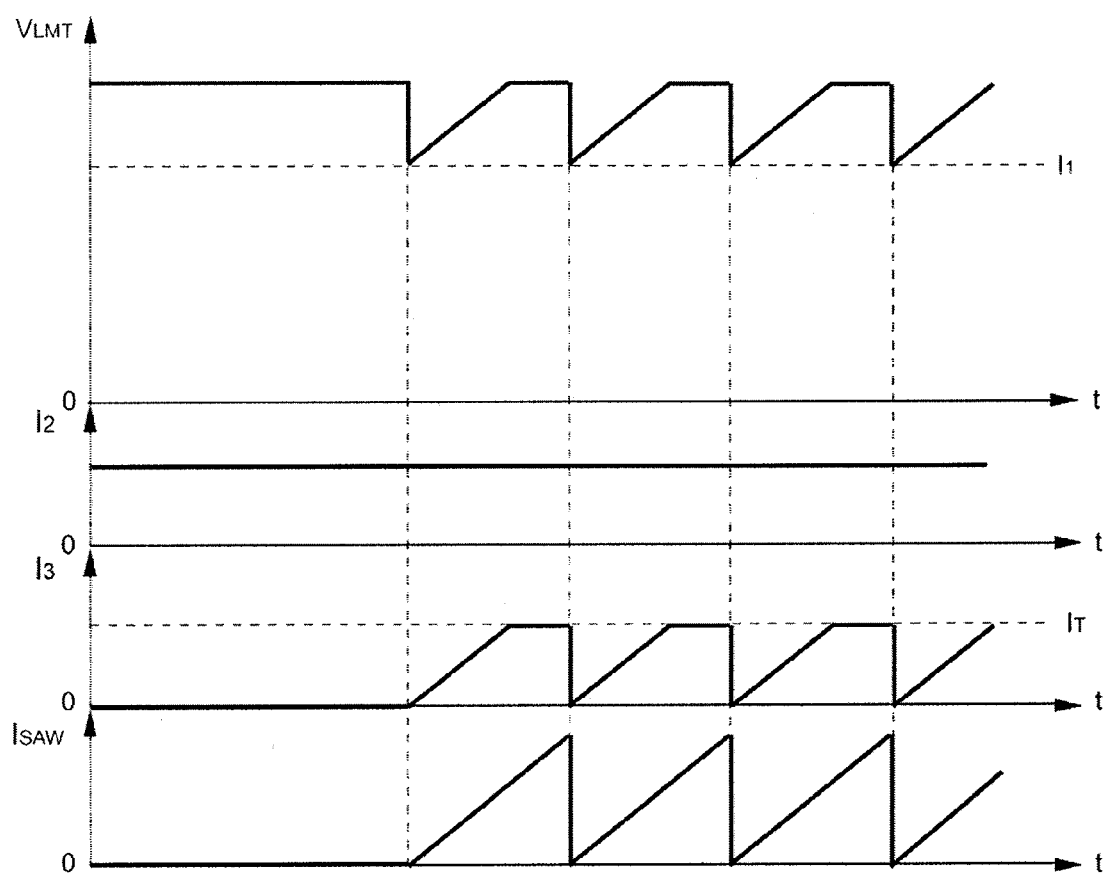
FIG. 5 shows the waveforms of the control circuit in accordance with the present invention.

Referring to FIG. 4 and FIG. 5, the waveform of the saw-limited circuit is shown in FIG. 5. When the voltage source $V_{CC}$ is logic-high before an output voltage is generated, the delay signal $S_1$ is still logic-low, and the control signal $V_D$ is logic-high through the inverter 642. Therefore, the switches $S_{W1}$ and $S_{W2}$ are turned on, and the current signal $I_{SAW}$ is bypassed to the ground through the switch $S_{W1}$ and the current-limited signal $I_{LMT}=I_1+I_2$. During this moment, the waveform of the saw-limited signal $V_{LMT}$ is a flatten level. The saw-limited signal $V_{LMT}$ is therefore generated in accordance with the current-limited signal $I_{LMT}$ flowing through the resistor $R_{LMT}$, wherein $V_{LMT}=I_{LMT}*R_{LMT}$. After a delayed time $t_{delay}$, the delay signal $S_1$ turns from logic-low to logic-high, and the control signal $V_D$ is low through the inverter 642. The switches $S_{W1}$ and $S_{W2}$ are turned off, and the current-limited signal $I_{LMT}=I_1+I_3$ and therefore the waveform of the saw-limited signal $V_{LMT}$ is a saw-limited waveform. From the above description, the waveform of the saw-limited signal $V_{LMT}$ is generated in response to the states of the control signal $V_D$. The saw-limited signal $V_{LMT}$ is at the flatten level when the control signal $V_D$ is enabled (ex: logic-high), and the waveform is the saw-limited waveform when the control signal $V_D$ is disabled (ex: logic-low).

Figure 6:
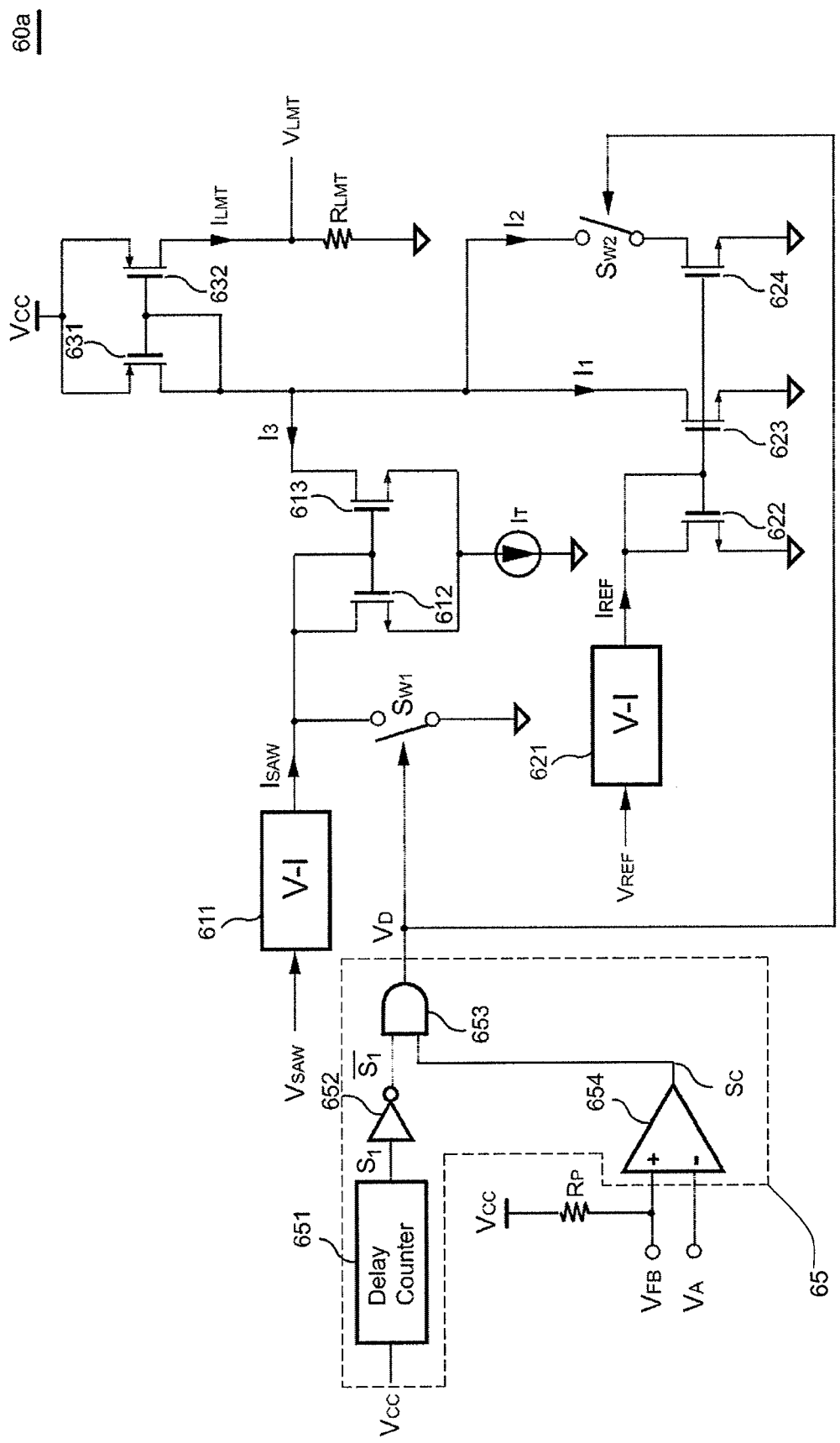
FIG. 6 illustrates another embodiment of the power limit of the control circuit in accordance with the present invention.

FIG. 6 shows a second embodiment of a power limiter 60a of the invention, the power-limiter 60a includes a delay unit 65 and a saw-limited circuit. The saw-limited circuit is the same as the schematic of the first embodiment so the description is omitted. The delay unit 65 in the second embodiment comprises a delay counter 651, an inverter 652, a comparison circuit 654 and a logic unit 653. The delay counter 651 is coupled to a voltage source $V_{CC}$ for generating a delay signal $S_1$ after a delay time $T_{delay}$ in response to the enabling of the voltage source $V_{CC}$. The inverter 652 is coupled to an output of the delayed counter 651 for inverting the delay signal $S_1$ to an inverted delay signal $\overline{S}_1$. The comparison circuit 654 is coupled to a feedback voltage $V_{FB}$ and a reference voltage $V_A$ for outputting a comparison signal $S_C$. The logic unit 653 (ex: an AND gate) is coupled to an output of the comparison circuit 654 and an output of the inverter 652 for generating a control signal $V_D$ in response to the inverted delay signal $\overline{S}_1$ and the comparison signal $S_C$.

When the voltage source $V_{CC}$ is logic-high before an output voltage is generated, the output of the delay counter 651 is still logic-low, and the output of the inverter 652 is logic-high. Since the output capacitor $C_O$ (as shown in FIG. 3) is short-circuit to the ground when AC line input is start-up before an output voltage is generated, the feedback voltage $V_{FB}$ will be pulled high by coupling to a voltage source $V_{CC}$ through a resistor $R_P$. The comparison signal $S_C$ at the output of the comparison circuit 654 is logic-high when the feedback signal $V_{FB}$ is higher than the reference voltage $V_A$. The control signal $V_D$ at the output of the logic unit 653 is also logic high because an output of the inverter 652 and the comparison signal $S_C$ are both logic-high. Thus, the switches $S_{W1}$ and $S_{W2}$ are turned on, a current signal $I_{SAW}$ is flowed to the ground through the switch $S_{W1}$, and the current-limited signal $I_{LMT}=I_1+I_2$. During this moment, the waveform of the saw-limited signal $V_{LMT}$ is a flatten level. A saw-limited signal $V_{LMT}$ is therefore generated in accordance with the current-limited signal $I_{LMT}$ flowed through a resistor $R_{LMT}$, wherein $V_{LMT}=I_{LMT}*R_{LMT}$.

The control signal $V_D$ will be turned to logic-low when the inverted delay signal $\overline{S}_1$ or the comparison signal $S_C$ is logic-low. After a period of the delay time $T_{delay}$ or the output voltage at the secondary winding $N_S$ of the power transformer $T_1$ generated, the feedback voltage $V_{FB}$ will be stabilized and decreased. The control signal $V_D$ is logic-low when the feedback signal $V_{FB}$ is smaller than the reference voltage $V_A$. The switches $S_{W1}$ and $S_{W2}$ are turned off, and the current-limited signal $I_{LMT}=I_1+I_3$ and therefore the waveform of the saw-limited signal $V_{LMT}$ is a saw-limited waveform.

Figure 7:
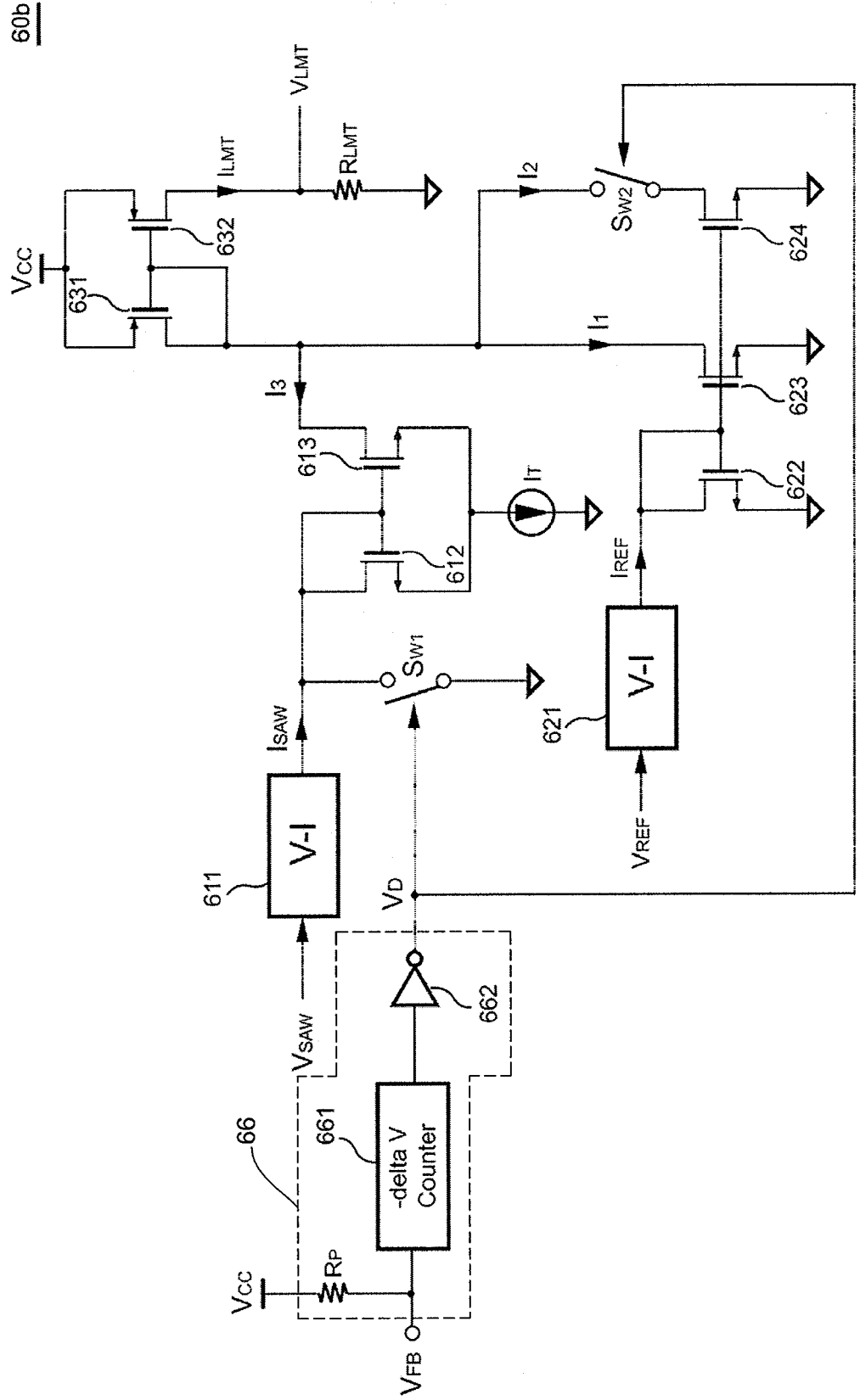
FIG. 7 illustrates another embodiment of the power limit of the control circuit in accordance with the present invention.

FIG. 7 shows a third embodiment of a power limiter 60b of the present invention, the power-limiter 60b includes a delay unit 66 and a saw-limited circuit. The saw-limit circuit is the same as the schematic of the first embodiment. The delay unit 66 of the third embodiment comprises a negative delta V counter 661, an inverter 662, and a pull-high resistor $R_P$. The negative delta V counter 661 is coupled to a feedback voltage $V_{FB}$ and a voltage source $V_{CC}$ through the pull-high resistor $R_P$. Since the output capacitor $C_O$ (as shown in FIG. 3) is short-circuit to the ground when AC line input is start-up before an output voltage is generated, the feedback voltage $V_{FB}$ will be pulled high by coupling to a voltage source $V_{CC}$ through the resistor $R_P$. At the mean time, the negative delta V counter 661 does not detect a negative delta V voltage, so the output of the negative delta V counter 661 is logic-low, and the output of the inverter 662 is logic-high. Therefore, the switches $S_{W1}$ and $S_{W2}$ are turned on, current signal $I_{SAW}$ is flowed to the ground through the switch $S_{W1}$ and the current $I_{LMT}=I_1+I_2$. During this moment, the waveform of the saw-limited signal $V_{LMT}$ is a flatten level. A saw-limited signal $V_{LMT}$ is therefore generated in accordance with the current-limited signal $I_{LMT}$ flowed through a resistor $R_{LMT}$, wherein $V_{LMT}=I_{LMT}*R_{LMT}$. Since the output capacitor $C_O$ (as shown in FIG. 3) is short-circuit to the ground when AC line input is start-up before an output voltage is generated, the feedback voltage $V_{FB}$ will be pulled high by coupling to a voltage source $V_{CC}$ through a resistor $R_P$.

After the output voltage at the secondary winding $N_S$ is established, the feedback voltage $V_{FB}$ will be stabilized and decreased. The negative delta V voltage is detected by the negative delta V counter 661, so the output terminal of the negative delta V counter 661 is logic-high (enable), and the control signal $V_D$ is logic-low through the inverter 662. When the control signal $V_D$ is logic-low, the switches $S_{W1}$ and $S_{W2}$ are turned off, and the current-limited signal $I_{LMT}=I_1+I_3$ and therefore the waveform of the saw-limited signal $V_{LMT}$ is a saw-limited waveform.

In contrast to the prior art, the power limiters 60, 60a and 60b of the present invention further employ the delay units 64, 65, and 66, respectively, to control the waveform of the saw-limited signal. By properly selecting a delay period and disabling the saw-limited signal, an unable start-up problem for the low-line voltage and heavy-load condition can be solved.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A PWM controller for compensating a maximum output power of a power converter including a power switch, comprising:
    an oscillator for generating a saw signal and a pulse signal;
    a power limiter coupled to the oscillator for generating a saw-limited signal in response to the saw signal; and
    a PWM unit coupled to the power limiter and the oscillator to generate a PWM signal for controlling the power switch in response to the saw-limited signal and the pulse signal;
    wherein the saw-limited signal has a level being flattened during a period of time before an output voltage is generated, and is then transformed to a saw-limited waveform after the period of time.

2. The PWM controller of claim 1, wherein the power limiter comprises:
    a delay unit for generating a control signal for controlling the waveform of the saw-limited signal; and
    a saw-limited circuit coupled to the delay unit and the oscillator for receiving the control signal and the saw signal and generating the saw-limited signal in response to states of the control signal.

3. The PWM controller of claim 2, wherein the saw-limited circuit comprises:
    a first reference circuit for generating a first reference signal;
    a second reference circuit coupled to the delayed unit for receiving the control signal and providing a second reference signal in response to the control signal; and a current limited circuit coupled to the oscillator, the delay unit, the first reference circuit and the second reference circuit for generating the saw-limited signal in response to the saw signal, the first reference signal, the second reference signal and the control signal.

4. The PWM controller of claim 2, wherein the delay unit comprises:
   a delay counter for generating a delay signal in response to an enabling of a voltage source; and
   an inverter coupled to the delay counter for inverting the delay signal and generating the control signal.

5. The PWM controller of claim 2, wherein the delay unit comprises:
   a negative delta V counter for generating a delay signal when detecting a negative delta V signal, wherein the delay signal is enabled once the output voltage is generated and a feedback voltage starts to decrease; and
   an inverter coupled to the negative delta V counter for inverting the delay signal and generating the control signal.

6. The PWM controller of claim 2, wherein the delay unit comprises:
   a delay counter for generating a delay signal in response to a voltage source;
   an inverter coupled to the delay counter for inverting the delay signal to generate an inverted delay signal;
   a comparison circuit for generating a comparison signal in response to a comparison between a feedback voltage and a reference voltage; and
   a logic unit for generating the control signal in response to the inverted delay signal and the comparison signal.

7. A power converter, comprising:
   a power switch for controlling a current flow through a transformer;
   a PWM controller for generating a PWM signal for controlling the power switch to switch the transformer, wherein the PWM controller comprises:
   an oscillator for generating a saw signal and a pulse signal;
   a power limiter coupled to the oscillator for generating a saw-limited signal in response the saw signal; and
   a PWM unit coupled to the power limiter and the oscillator for generating the PWM signal for controlling the power switch in response to the saw-limited signal and the pulse signal;
   wherein the saw-limited signal has a level being flattened during a period of time before an output voltage is generated, and is then transformed to a saw-limited waveform after the period of time.

8. The power converter of claim 7, wherein the power limiter comprises:
   a delay unit for generating a control signal for controlling the waveform of the saw-limited signal; and
   a saw-limited circuit coupled to the delay unit and the oscillator for receiving the control signal and the saw signal and generating the saw-limited signal in response to states of the control signal.

9. The power converter of claim 8, wherein the saw-limited circuit comprises:
   a first reference circuit for generating a first reference signal;
   a second reference circuit coupled to the delayed unit for receiving the control signal and providing a second reference signal in response to the control signal; and
   a current limited circuit coupled to the oscillator, the delay unit, the first reference circuit, and the second reference circuit for generating the saw-limited signal in response to the saw signal, the first reference signal, the second reference signal and the control signal.

10. The power converter of claim 8, wherein the delay unit comprises:
    a delay counter for generating a delay signal in response to an enabling of a voltage source; and
    an inverter coupled to the delay counter for inverting the delay signal to generate the control signal.

11. The power converter of claim 8, wherein the delay unit comprises:
    a negative delta V counter for generating a delay signal when detecting a negative delta V signal, wherein the delay signal is enabled once the output voltage is generated and a feedback voltage starts to decrease; and
    an inverter coupled to the negative delta V counter for inverting the delay signal to generate the control signal.

12. The power converter of claim 8, wherein the delay unit comprises:
    a delay counter for generating a delay signal in response to a voltage source;
    an inverter coupled to the delay counter for inverting the delay signal to generate an inverted delay signal;
    a comparison circuit for generating a comparison signal in response to a comparison between a feedback voltage and a reference voltage; and
    a logic unit for generating the control signal in response to the inverted delay signal and the comparison signal.

* * * * *